(12) United States Patent
Jun et al.

(10) Patent No.: US 12,295,504 B2
(45) Date of Patent: May 13, 2025

(54) FOLDING JOINT AND FOLDABLE INFANT BED

(71) Applicant: Kunshan Aspire Children's Product's Co. Ltd., JiangSu (CN)

(72) Inventors: Qi Jun, JianSu (CN); Yepeng Tan, JianSu (CN)

( * ) Notice: Subject to any disclaimer, the term of this patent is extended or adjusted under 35 U.S.C. 154(b) by 167 days.

(21) Appl. No.: 17/245,858

(22) Filed: Apr. 30, 2021

(65) Prior Publication Data

US 2022/0095813 A1    Mar. 31, 2022

(51) Int. Cl.
*A47D 9/00* (2006.01)
*F16D 3/06* (2006.01)

(52) U.S. Cl.
CPC .............. *A47D 9/005* (2013.01); *F16D 3/065* (2013.01)

(58) Field of Classification Search
CPC .......... A47D 9/00; A47D 9/005; A47D 9/008; A47D 9/012; A47D 9/02; A47D 11/00; A47D 11/002; A47D 11/005; A47D 11/007; A47D 11/02; A47D 13/00; A47D 13/02; A47D 13/06; A47D 13/061; A47D 7/00; A47D 7/002; F16D 3/065
See application file for complete search history.

(56) References Cited

U.S. PATENT DOCUMENTS

| | | | | |
|---|---|---|---|---|
| 630,851 A * | 8/1899 | Brass | ............... | A47D 13/105 5/101 |
| 3,839,754 A * | 10/1974 | Hooper | ............... | A47D 5/006 248/164 |
| 5,376,052 A * | 12/1994 | Jacob | ............... | F16D 3/065 464/145 |
| 8,844,072 B2 * | 9/2014 | Bellows | ............... | A47C 9/005 5/101 |
| 10,154,737 B2 * | 12/2018 | Horst | ............... | A47D 5/00 |
| 10,779,659 B1 * | 9/2020 | Flannery | ............... | A47D 9/005 |
| 2006/0021137 A1 * | 2/2006 | Waldman | ............... | A47D 13/063 5/99.1 |
| 2006/0037137 A1 * | 2/2006 | Song | ............... | A47D 13/063 5/99.1 |
| 2008/0189854 A1 * | 8/2008 | Thorne | ............... | A47D 13/061 5/99.1 |
| 2010/0162484 A1 * | 7/2010 | Thomas | ............... | A47D 9/016 5/93.1 |
| 2011/0076912 A1 * | 3/2011 | Snyder | ............... | A63H 33/006 446/227 |
| 2012/0037869 A1 * | 2/2012 | Fiore, III | ............... | A47D 9/005 256/25 |
| 2012/0204347 A1 * | 8/2012 | Li | ............... | A47D 5/006 5/93.1 |
| 2013/0232688 A1 * | 9/2013 | Mendes | ............... | A47D 13/061 5/99.1 |

(Continued)

FOREIGN PATENT DOCUMENTS

EP    2532282 A1 * 12/2012    ............. A47D 7/005

*Primary Examiner* — Justin C Mikowski
*Assistant Examiner* — George Sun
(74) *Attorney, Agent, or Firm* — Saul Ewing LLP

(57) ABSTRACT

A foldable infant bed with an unfolded position and a folded position, comprising a plurality of vertical supports and a chassis support arranged between the plurality of vertical supports. A folding joint including a first main support frame, a second main support frame, a first auxiliary support rod, and a second auxiliary support rod, and a rotation mechanism for the foldable infant bed is also provided.

5 Claims, 5 Drawing Sheets

(56) References Cited

U.S. PATENT DOCUMENTS

| | | | | |
|---|---|---|---|---|
| 2014/0041116 A1* | 2/2014 | Rosenthal | ............ | A47D 13/063 |
| | | | | 5/99.1 |
| 2015/0216321 A1* | 8/2015 | Hartenstine | ............ | A47D 5/006 |
| | | | | 5/655 |
| 2015/0272343 A1* | 10/2015 | Hung | ................... | A47D 13/061 |
| | | | | 5/99.1 |
| 2016/0338506 A1* | 11/2016 | Yang | .................... | A47D 13/063 |
| 2017/0280892 A1* | 10/2017 | Zhang | ................... | A47D 13/063 |
| 2018/0168365 A1* | 6/2018 | Huang | ................. | A47D 7/002 |
| 2018/0303250 A1* | 10/2018 | Mountz | ................. | A47D 7/002 |
| 2018/0360230 A1* | 12/2018 | Tuckey | ................. | A47D 9/005 |
| 2019/0045944 A1* | 2/2019 | Yang | .................... | A47D 7/002 |
| 2020/0077807 A1* | 3/2020 | Taylor | ................. | A47D 13/063 |
| 2020/0146465 A1* | 5/2020 | Thorne | ................ | A47D 13/063 |
| 2020/0281369 A1* | 9/2020 | Juchniewicz | ........... | F16H 19/04 |
| 2022/0025917 A1* | 1/2022 | Chen | ..................... | A47D 7/002 |

\* cited by examiner

FOLDING JOINT AND FOLDABLE INFANT BED

TECHNICAL FIELD

The invention relates to a folding joint adapted for use with a foldable infant bed.

SUMMARY

The technical problem to be solved by the invention is to provide a foldable infant bed frame and a folding joint having a deployment position and a folding position.

In some embodiments of the invention, a foldable infant bed with unfolding position and folding position comprising a plurality of vertical support frames, and a chassis support frame arranged between the plurality of vertical support frames is provided. The chassis support frame comprises a central base positioned at a middle part, a plurality of groups of connecting rod mechanisms surrounding the central base, each group of connecting rod mechanisms is respectively connected between the corresponding vertical support frames and the central base. Each group of connecting rod mechanisms comprises an upper bottom rod positioned at the upper part, a lower bottom rod positioned below the upper bottom rod, one end of the upper bottom rod is pivotally connected with the upper part of the central base around a first bottom shaft, the other end of the upper bottom rod and the corresponding vertical support frame are arranged by a first spherical joint, and the upper bottom rod is pivoted with the upper part of the central base. One end of the lower base rod is pivotally connected with the lower part of the central base around the second bottom shaft, and the other end of the lower base rod is rotationally arranged with the corresponding vertical supporting frame through the second ball joint. During the upward movement of the central base, a plurality of vertical supporting frames are synchronously pushed to close under the driving of a plurality of groups of connecting rod mechanisms, and during the downward movement of the central base, a plurality of vertical supporting frames are synchronously pushed to open under the driving of a plurality of groups of connecting rod mechanisms.

In some embodiments, an upper deployment limit mechanism is arranged between each upper bottom rod and the central seat, or between each upper bottom rod and a corresponding vertical support rod, and a lower deployment limit mechanism is arranged between each lower bottom rod and the central seat, or between each lower bottom rod and a corresponding vertical support rod.

In some embodiments, the upper expansion limit mechanism includes an upper one-way joint fixed on a plurality of upper caps of the upper part of the central base, the lower expansion limit mechanism includes a lower one-way joint fixed on a plurality of upper caps of the lower part of the central base, one end of the upper bottom rod is pivotally connected with the upper one-way joint about a first bottom shaft, one end of the lower bottom rod is pivotally connected with the lower one-way joint about a second bottom shaft, when the foldable infant bed is in the expansion position, the upper bottom rod is abutting on the top of the upper one-way joint, the lower bottom rod is abutting on the top of the seal of the lower one-way joint, and the upper one-way joint and the lower one-way joint form an integral body on the central base. In some embodiments, a first bottom shaft on each set of the link mechanisms is disposed in parallel with the second bottom shaft.

In some embodiments, the vertical support comprises two first vertical support frames and two second vertical support frames, the upper parts of the two first vertical support frames are respectively pivotally connected with the upper parts of the corresponding second vertical support frames to form a side bed frame at the left and right sides, the side bed frame at each side also comprises a first bed frame and a second bed frame, the upper parts of the first vertical support frames at each side, the upper parts of the second vertical support frames, the first bed frame and the second bed frame are respectively pivotally connected by a concentric shaft, and a side support lock mechanism for controlling the locking position is arranged between the four.

In some embodiments, the first bed enclosure includes two first bed enclosures whose one end is rotationally connected by a first one-way rotation joint, and the other end of the first bed enclosures are rotationally connected to the first bed enclosures by a first shaft axis, The second bed enclosure comprises two second bed enclosures whose one end is rotationally connected by a second one-way rotary joint, and whose other end is rotationally connected to the second bed enclosure by a second shaft. A first mandrel is arranged in parallel with the rotating shaft on the first one-way rotating joint and is vertically arranged with the phase space of the concentric shaft. A second mandrel is arranged in parallel with the rotating shaft on the second one-way rotating joint and is also vertically arranged with the phase space of the concentric shaft.

In some embodiments, the link mechanism has four groups and the center seat in the middle is X-shaped in an expanded position.

In some embodiments, the invention relates to a folding joint for a foldable infant bed with a unfolding position and a folding position, which comprises a first main supporting rod, a second main supporting rod, a first auxiliary supporting rod, a second auxiliary supporting rod and a synchronous rotating mechanism, wherein, the synchronous rotating mechanism comprises a moving part, a first driving groove arranged on the first main supporting rod, a second driving groove arranged on the second main supporting rod, a first guiding groove arranged on the first auxiliary supporting rod, a second guiding groove arranged on the second auxiliary supporting rod, when the folding joint is unfolding or folding, the moving part is inserted in the first driving groove, the second driving groove, the first guiding groove and the second guiding groove, and the moving part moves along the radial direction relative to the shaft center of the concentric shaft, thereby the first main supporting rod, the second main supporting rod, the first auxiliary supporting rod and the second auxiliary supporting rod rotate among the four parts.

In some embodiments, the first guide groove includes a first guide groove section, a first lock groove section which is bent relative to the extending direction of the first guide groove section and is communicated with one end thereof, the second guide groove includes a second guide groove section, a second lock groove section which is bent relative to the extending direction of the second guide groove section and is communicated with one end thereof, and the moving piece is positioned in the first lock groove section and the second lock groove section when the folding joint is positioned in the unfolding position.

In some embodiments, the first lock slot segment and the second lock slot segment are straight-shaped slots, and when the folding joint is in an unfolded position, the center line of the first lock slot segment and the second lock slot segment overlaps with the connecting line between the center of the moving member and the axis of the concentric shaft.

In some embodiments, the first channel segment and/or the second channel segment have an elastic limit member extending outwardly from a portion of the channel wall and forming a limit bump at the end portion, the limit bump being adjacent to the other end portion of the first channel segment or the other end portion of the second channel segment, and the limit bump portion being blocked on the moving path of the moving member.

In some embodiments, the center of the moving member is connected with the axis of the concentric shaft to form a symmetrical line, the first driving groove and the second driving groove are symmetrical left and right relative to the symmetrical line, the first driving groove and the second driving groove are straight grooves respectively.

In some embodiments, the synchronous rotating mechanism also includes a slider groove provided on the first main supporting rod or the second main supporting rod, a slider slidably provided in the slider groove, a slider locating member fixed on the corresponding slider groove and the slider. The first driving groove or the second driving groove is positioned at the center of the corresponding slider groove. The slider locating member is provided with a slider locating member groove corresponding to the first driving groove or the second driving groove. The moving member is inserted into the slider locating member groove through the slider.

In some embodiments, the first auxiliary supporting rod and/or the second auxiliary supporting rod are fixed with reinforcing iron sheets which are respectively provided with reinforcing iron sheet grooves corresponding to the first guiding groove and/or the second guiding groove, and the moving piece is also inserted in the reinforcing iron sheet grooves.

In some embodiments of the invention, an infant bed includes two folding joints, which are respectively symmetrically arranged at two sides of the infant bed, and the first auxiliary supporting rod on each side is rotationally connected with one end part of the first bed supporting rod through a first shaft of the first supporting rod. The first supporting rod on each side is connected with the first bed supporting rod through a first shaft of the supporting rod, and is provided with a plurality of supporting rods. The second auxiliary supporting rod on each side is rotationally connected with one end part of the second bed frame by a second round rod shaft. A first one-way rotating joint is arranged between the other end parts of the first bed frame on the two sides. A second one-way rotating joint is arranged between the other end parts of the second bed frame on the two sides. The first round rod shaft is arranged in parallel with the rotating shaft on the first one-way rotating joint and is vertically arranged with the space of the concentric shaft. The second round rod shaft is arranged in parallel with the rotating shaft on the second one-way rotating joint and is also vertically arranged with the space of the concentric shaft, and a central supporting frame is arranged between the four of the first main supporting rod on the two sides and the second main supporting rod on the two sides, so as to push the four to move synchronously.

In some embodiments, the central support includes a central seat in the middle, four sets of connecting rod mechanisms surrounding the central seat, the four sets of connecting rod mechanisms being respectively connected between two first main support rods, two second main support rods, and the central seat.

In some embodiments, each group of the connecting rod mechanisms comprises an upper bottom rod located on the upper part, and a lower bottom rod located below the upper bottom rod. One end of the upper bottom rod is pivotally connected with the upper part of the central base around a first bottom shaft. The other end of the upper bottom rod and the corresponding main support rod are rotatably arranged through a first ball joint. One end of the lower bottom rod is pivotally connected with the lower part of the central base around a second bottom shaft. The other end of the lower bottom rod and the corresponding main support rod are rotatably arranged through a second ball joint. A generally flat upper limit mechanism is arranged between each upper bottom rod and the central base, and a generally flat lower limit mechanism is arranged between each lower bottom rod and the central base.

The details of one or more embodiments of the invention are set forth in the accompanying drawings and the description below. Other features, objects, and advantages of the invention will be apparent from the description and drawings, and from the claims.

DETAILED DESCRIPTION OF PREFERRED EMBODIMENTS

Figure 1:
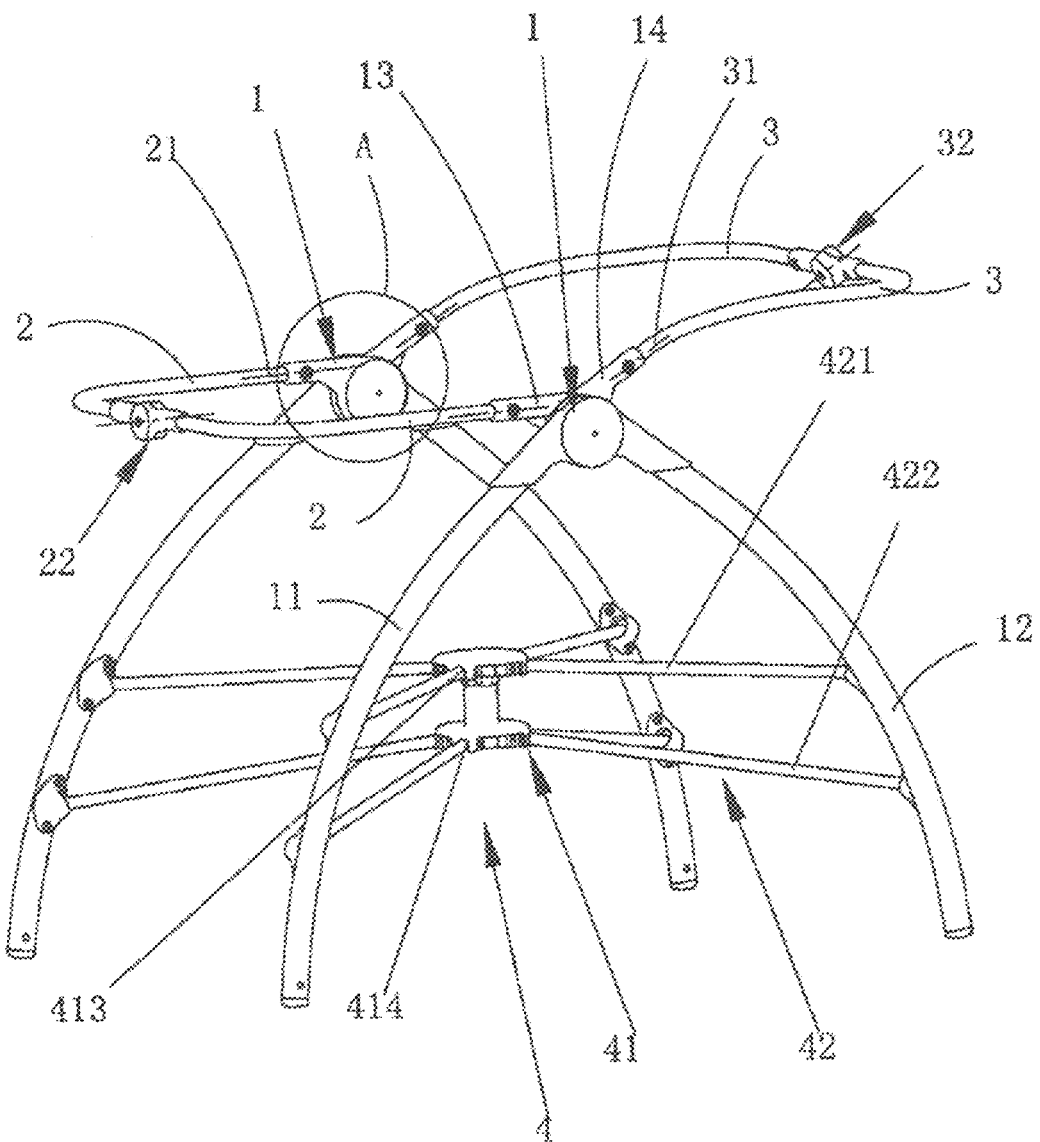
FIG. 1 is a perspective view of the unfolded state of the foldable infant bed.

The foldable infant bed includes four vertical supporting frames 11 and 12, a chassis supporting frame 4 arranged between a plurality of vertical supporting frames, the chassis supporting frame 4 includes a central base 41 located in the middle part, and four groups of connecting rod mechanisms 42 surrounding the central base 41, wherein, the central base 41 is divided into an X-shaped seat at the upper part and the lower part, and the upper part and the lower part are respectively provided with four vertical symmetrical bottom shaft pivots.

The four groups of connecting rod mechanisms 42 are respectively connected between the corresponding vertical supporting frame and the central base 41, and each group of connecting rod mechanisms 42 is respectively connected between the corresponding vertical supporting frame and the central base, and each group of connecting rod mechanisms 42 comprises an upper bottom rod 421 and a central base 42 positioned at the upper part. Another end of the upper bottom bar 421 is pivoted about a first bottom shaft 411 at one end of the upper bottom bar 421 and the upper part of the center seat 41, and the corresponding vertical support is rotatably arranged through a first ball joint. One end of the lower bottom bar 422 is connected with the lower part of the center seat 412 around a second bottom shaft 412 pivot, and the other end of the lower bottom bar 422 is rotatably arranged with the corresponding vertical support via a second ball joint. Between each upper bottom rod 421 and a center seat 41, an upper unfolding limit mechanism is arranged, and a lower unfolding limit mechanism is arranged between each lower bottom rod 422 and the center seat 41, wherein, the upper unfolding limit mechanism comprises an upper one-way joint 413 which is fixed on a plurality of upper sealing tops of the upper part of the center seat 41. The lower unfolding limit mechanism comprises a plurality of lower one-way joint 414 which are fixed on the lower part of the center seat 41. One end of the upper bottom rod 421 is pivotally connected with the upper one-way joint 413 around the first bottom shaft 411, and the lower one-way joint is pivoted. When the foldable infant bed is in the unfolded position, the upper bottom rod 421 abuts on the top of the seal of the upper one-way joint 413, the lower bottom rod 422 abuts on the top of the seal of the lower one-way joint 414.

Figure 2:
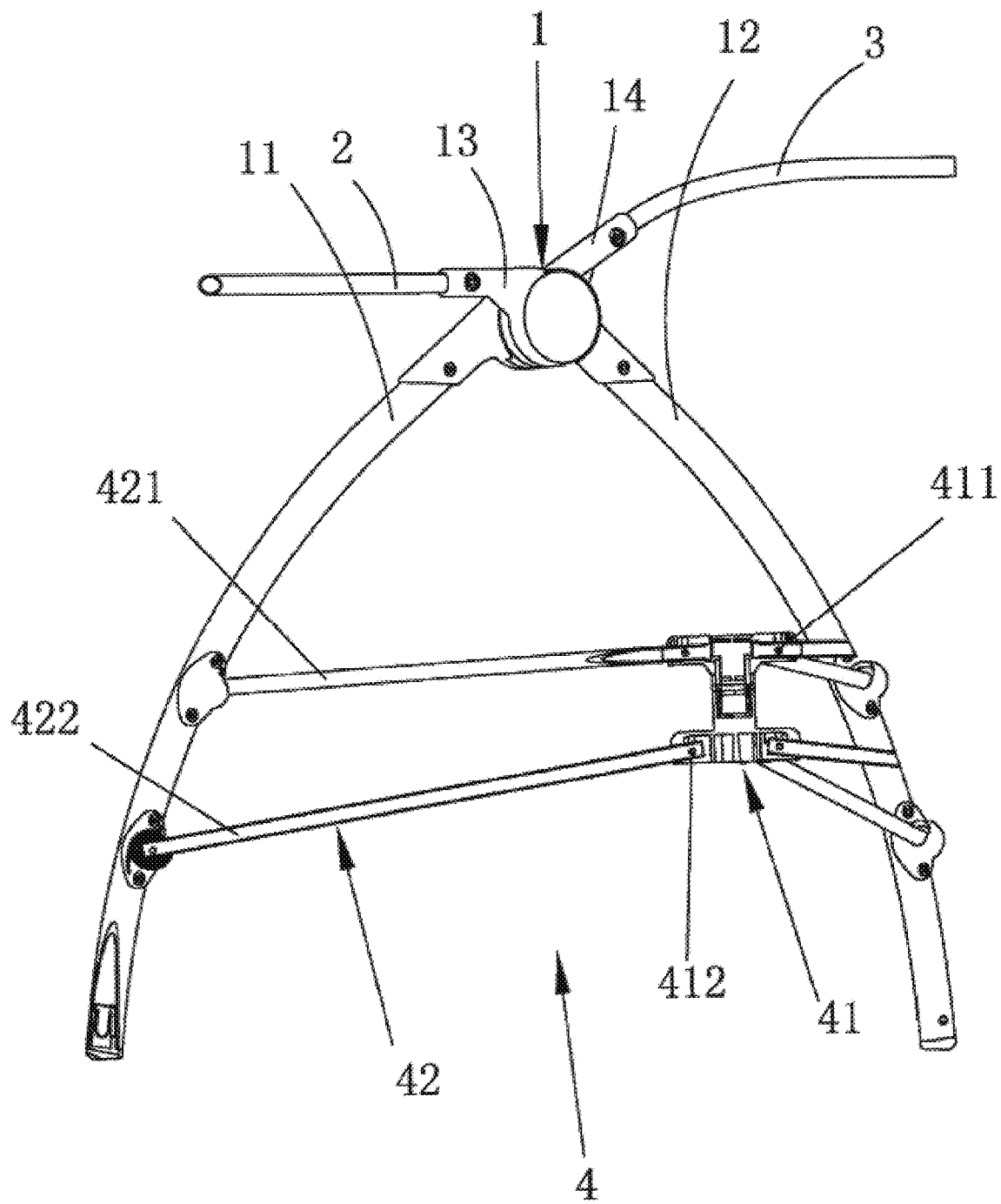
FIG. 2 is a side view of the unfolding state of the foldable infant bed.
Figure 3:
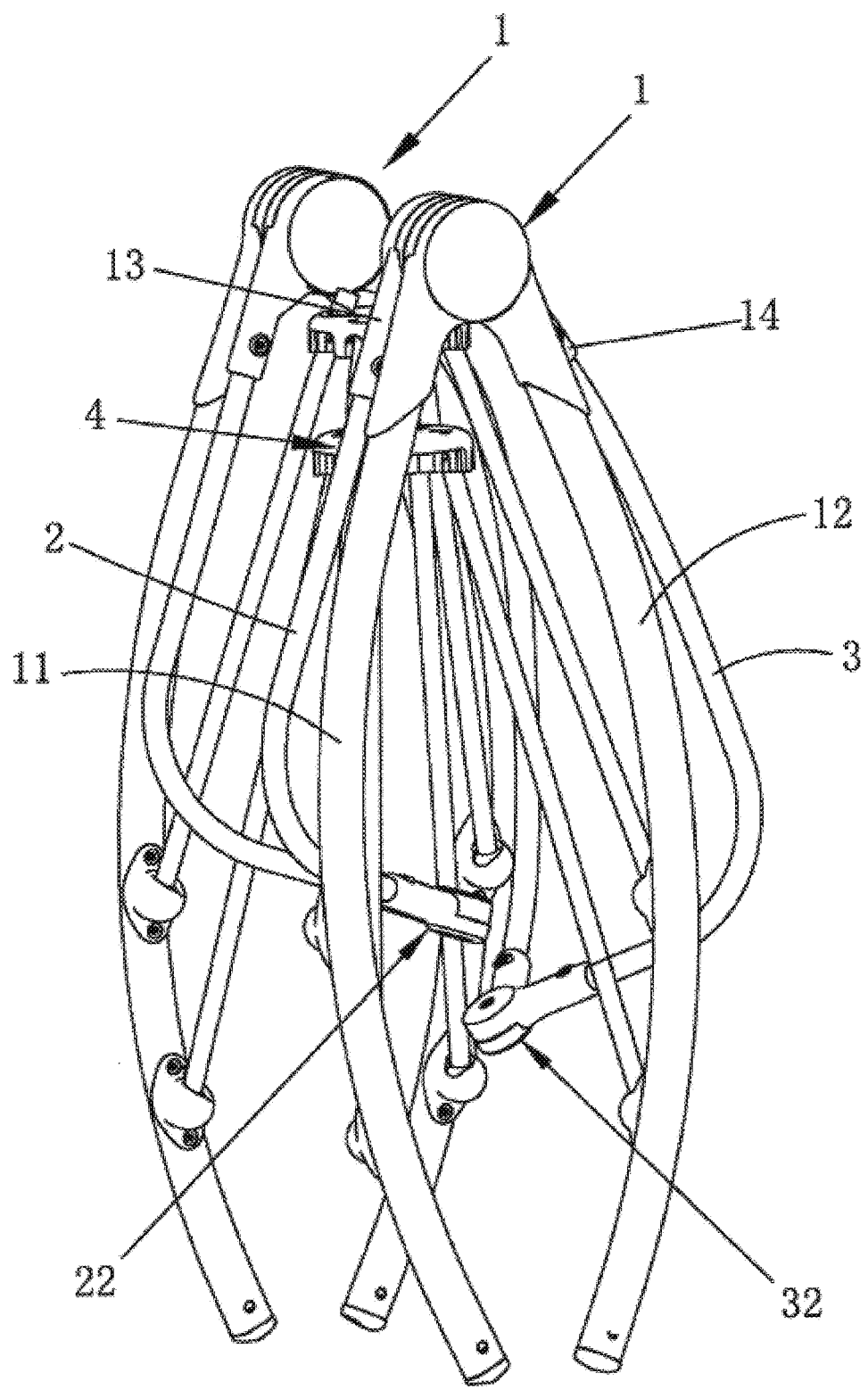
FIG. 3 is a perspective view of the folded stated of the foldable infant bed.

In the embodiment, as shown in the FIGS. 1-3, each first main vertical support frame 11 is pivotally connected with the corresponding second vertical support frame 12, forming opposed side bed frames 1, which are respectively symmetrically arranged on two sides of the foldable infant bed. Each side bed frame 1 further comprises a first bed seat 13 and a second bed seat 14 which are respectively arranged at one end part separately around the first vertical support frame 11 and the second vertical support frame 12, and are rotationally arranged around a concentric axis.

As shown in FIGS. 1-3, each side bed frame 1 also includes a side frame locking mechanism 15. In this embodiment, the side frame locking mechanism 15 may adopt synchronous folding and unfolding embodiments 1.

Figure 5:
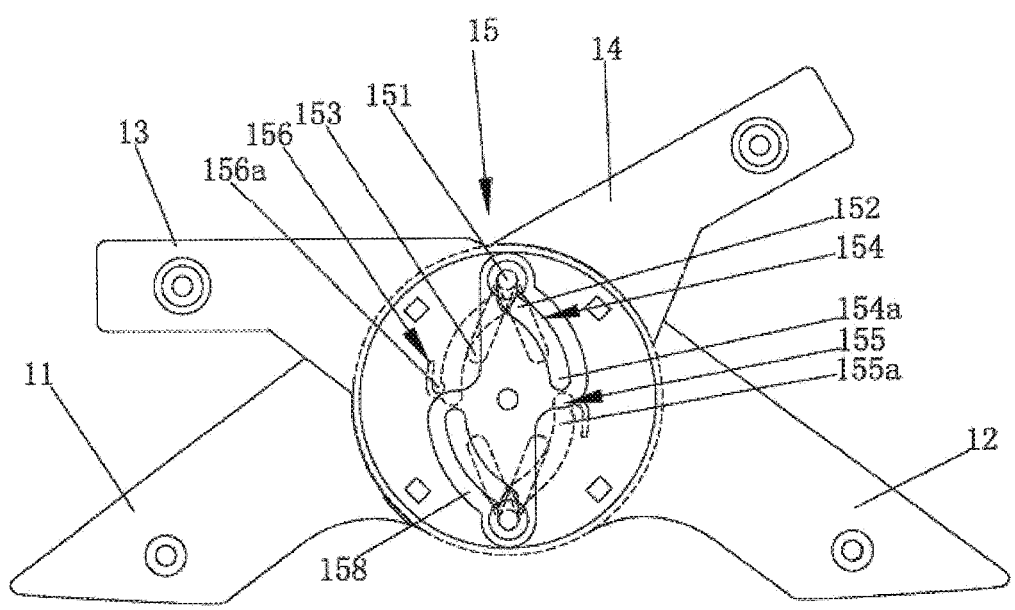
FIG. 5 is the diagram of the inner structure of the side bed frame under the deployment position.

Referring to FIG. 5, the side bracket lock mechanism 15 comprises a moving piece 151 adopting a pin, a first driving groove 152 arranged on the first upright bracket 11, a second driving groove 153 arranged on the second upright bracket 12, a first guide groove 154 arranged on the first bed seat or auxiliary support rod 13, and a second guide groove 155 arranged on the second bed seat auxiliary support rod 14.

Figure 4:
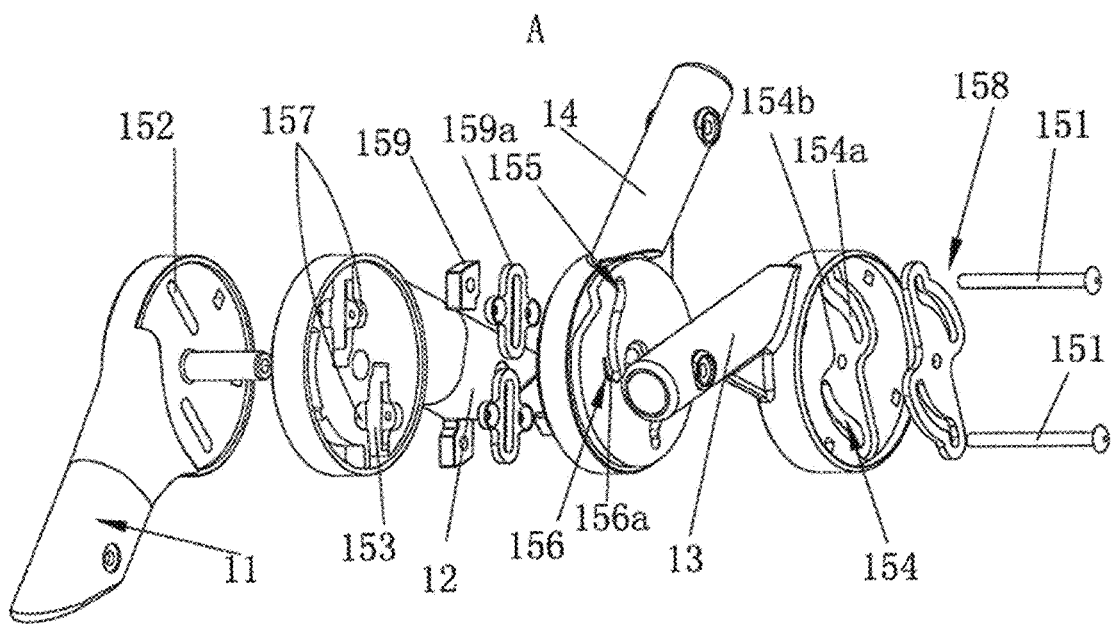
FIG. 4 is an exploded view of the element A of FIG. 1.
Figure 6:
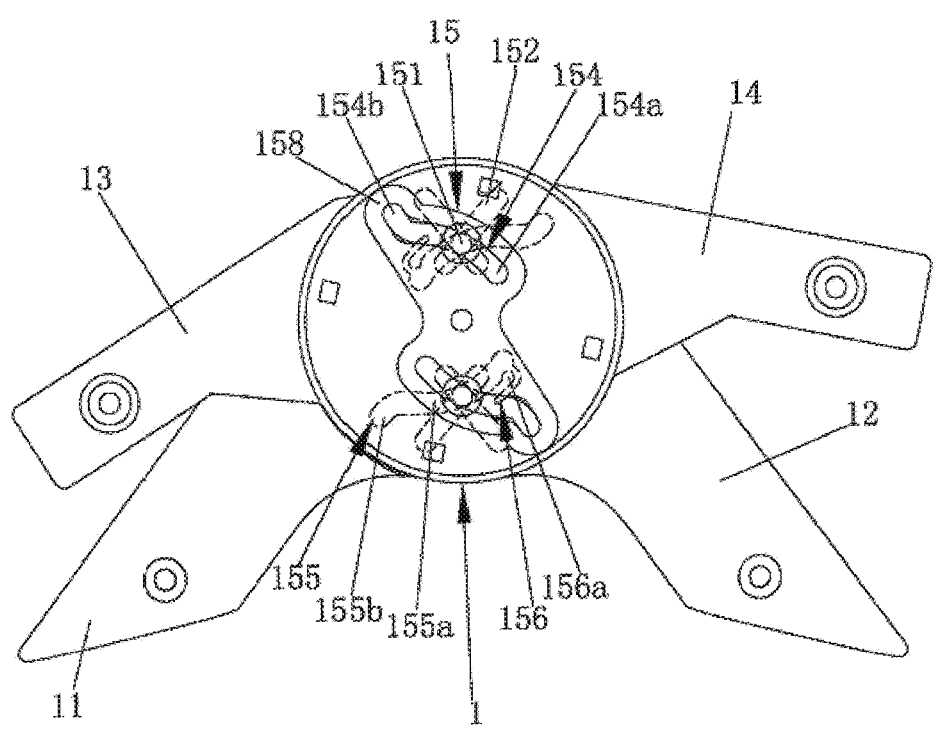
FIG. 6 is the diagram of the inner structure of the side bed during the folding process.

In the embodiment, as shown in the attached FIG. 4-6, the first guide groove 154 comprises a first guide groove section 154*a*, a first lock groove section 154*b* which is bent relative to the extending direction of the first guide groove section 154*a* and is communicated with one end thereof. The second guide groove 155 comprises a second guide groove section 155*a*, a second lock groove section 155*b* which is bent relative to the extending direction of the second guide groove section 155*a* and is communicated with one end thereof, wherein the first lock groove section 154*b* and the second lock groove section 155*b* are all straight-shaped grooves, and the first lock groove section 154*b* and the second lock groove section are connected with one end thereof. When the side bed frame 1 is in the unfolding position, the moving member 151 of the pin is simultaneously in the first lock groove section 154*b* and the second lock groove section 155*b*. The center line of the first lock groove section 154*b* and the second lock groove section 155*b* is overlapped with the connecting line between the center of the moving member 151 and the center of the concentric shaft, the first bed seat 13 and the second bed seat 14 cannot slide relative to the moving member 151, namely, the first bed seat 13 and the second bed seat 14 are locked. At this time, the angle of the first and second standing supports 11 and 12 is extended to the pole root position, so that the moving part 151 position is positioned under the action of the first driving groove 152 and the second driving groove 153, so that the first bed seat 13 and the second bed seat 14 are fixed relative to the positions of the first standing supports 11 and the second standing supports 12.

Also, as shown in the FIGS. 4-6, the second guide groove section 155*a* has an elastic limit member 156 extending outwards from the part of the groove wall and forming a limit projection 156*a* at the end thereof, and the limit projection 156*a* is adjacent to the other end of the second guide groove section 155*a*, and the limit projection 156*a* portion is blocked on the moving path of the moving member 151. During the folding process, the limit projection 156*a* portion is arranged on the moving path of the moving member 151. At this time, the limit bump 156*a* plays a deployment damping function on the moving piece 151, and it requires a user to rotate the second bed seat 14 upward to expand the foldable infant bed, namely, the elastic limit piece 156 with the limit bump 156*a* plays a folding position positioning function on the whole foldable infant bed.

Also as shown in the FIG. 4, a reinforcing iron sheet 158 is fixed on the first bed 13, the reinforcing iron sheet 158 is respectively provided with a reinforcing iron sheet groove corresponding to the first guide groove 154, and a moving piece 151 is also inserted in the reinforcing iron sheet groove, thereby enhancing the compressive capacity of the entire side bracket locking mechanism 15, and preventing the side bracket locking mechanism 15 from being damaged when the whole foldable infant bed is under a larger pressure.

In the embodiment, as shown in the attached FIG. 4, the first driving groove 152 and the second driving groove 153 are straight grooves, the connecting line between the center of the moving member 151 passing through the two driving grooves and the axis of the concentric shaft forms a symmetrical line. The first driving groove 152 is symmetrical to the left and right of the second driving groove 153 relative to the symmetrical line, and the moving member 151 is close to or far away from the coaxial line relative to the concentric shaft.

As shown in the FIG. 4, the side bracket locking mechanism 15 also comprises a slider groove 157 arranged on the second vertical bracket 12. A slider 159 is slidably arranged in the slider groove 157. A slider positioning member 159*a* is fixed on the corresponding slider groove 157 and the slider 159. The slide slot 157 is a cross slot. The second drive slot 153 is positioned at the center of the corresponding slide slot 157. The slide positioning piece 159*a* is provided with a slide positioning piece slot corresponding to the second drive slot 153. The moving piece 151 is inserted into the slide positioning piece slot through the slide block 159, so that the whole moving piece 151 slides in the drive slot when the foldable baby bed is expanded or folded, and the central line of the moving piece 151 does not generate distortion.

During the folding or unfolding of the infant bed, the moving member (151) slides in the radial direction with respect to the first driving groove (152), the second driving groove (153), the first guiding groove (154), the second guiding groove (155), and the moving member (151) moves gradually in the radial direction with respect to the concentric axis.

With respect to one end of the first drive groove 152 to the other end, one end of the second drive groove 153 to the other end, one end of the first guide groove 154 to the other end, and one end of the second guide groove 155 to the other end, the distances from each other end to the concentric shaft is gradually shortened, and the radial intersecting fork of the circle of the concentric shaft center is respectively crossed.

In this embodiment, the foldable infant bed also includes, as shown in FIG. 1-3: The first bed seat 13 on each side, which is rotationally connected with an end part of the first bed seat by a first rod shaft 21, and the second bed seat 14 on each side, which is rotationally connected with an end part of the second bed rod 3 by a second rod shaft 31. A first one-way rotating joint 22 is arranged between the other ends of the first bed enclosing rod 2 on both sides, and a second one-way rotating joint 32 is arranged between the other ends of the second bed enclosing rod 3 on both sides.

The first spindle shaft 21 is arranged in parallel with a rotation shaft on the first one-way rotation joint 22 and is vertically arranged with a concentric shaft phase space. The second spindle shaft 31 is arranged in parallel with the rotation shaft on the second one-way rotation joint 32 and is also vertically arranged with the concentric shaft phase space.

In the case of side bracket lock mechanism 15, when the baby carriage is unfolded or folded, the center seat 41 moves upward, under the action of the upper bottom rod 421 and the lower bottom rod 422, two first standing support frames 11 and two second standing support frames 12 are driven. The four rods are moved to the center synchronously, and also can be said that the adjacent first standing support frames 11 and the second standing support frames 12 and the two first standing support frames 11 are respectively close to each other, and then the two second standing support frames 12 are driven to realize the folding of the bracket lock mechanism 15.

When the central base 41 moves downwards, under the action of the upper bottom rod 421 and the lower bottom rod 422, two first standing supporting frames 11 and two second standing supporting frames 12 are driven. The four rods are synchronously extended to the periphery, and the adjacent first standing supporting frames 11 and the second standing supporting frames 12. The two first standing supporting frames 11 and the two second standing supporting frames 12 are separated from each other, respectively. When the four groups of connecting rods are deployed to the upper deployment limit mechanism and the lower deployment limit mechanism on the central base 41, the upper sealing position of the upper one-way joint 413 and the lower one-way joint 414 is contacted to stop the position limit, and the adjacent first stand-up frame 11 is deployed to the limit position between the two first stand-up frame 12 and the two second stand-up frame 12.

During the process of two side bed frames 1 unfolding or folding around the concentric shaft, two first bed enclosing rods 2 are driven to flatten or close through the first one-way rotating joint 22. The second bed enclosing rods 3 are flattened or close through the second one-way rotating joint 32, so that the plurality of vertical supporting frames are driven to fold or open synchronously by the driving of a plurality of groups of connecting rod mechanisms. The first bed enclosing rods 2, the second bed enclosing rods 3 are driven to extend or close together.

In addition, in the embodiment, the one-way rotating joint adopted between the two first bed enclosing rods 2 and the two second bed enclosing rods 3 is only one rotating shaft inside to cooperate with the expansion or folding of the whole foldable infant bed, and the double rotating shaft can also be adopted.

A presently preferred embodiment of the invention has been described. Nevertheless, it will be understood that various modifications may be made without departing from the spirit and scope of the invention. Accordingly, other embodiments are within the scope of the following claims.

What is claimed is:

1. A foldable infant bed with an unfolded position and a folded position, the infant bed comprising:
    a plurality of vertical supports; and
    a chassis support arranged between the plurality of vertical supports, the chassis support includes a center seat and a plurality of linkage mechanisms surrounding the center seat, each of the plurality of linkage mechanisms being connected to the center seat and connected to one of the plurality of vertical supports;
    wherein each of the plurality of linkage mechanisms includes an upper bottom rod, and a lower bottom rod located below the upper bottom rod, a first end of the upper bottom rod pivotally connected with an upper part of the center seat and a second end of the upper bottom rod rotatably connected with a corresponding vertical support by a ball joint, a first end of the lower bottom rod pivotally connected with a lower part of the center seat and a second end of the lower bottom rod rotatably connected with a corresponding vertical support by a ball joint, whereby upward movement of the center seat drives the plurality of linkage mechanisms and causes synchronous closing movement of the vertical supports, and whereby downward movement of the center seat drives the plurality of linkage mechanisms and cause synchronous expanding movement of the vertical supports.

2. The foldable infant bed of claim 1 further comprising between at least one of the upper bottom rods and the center seat or at least one of the lower bottom rods and the center seat an unfolding limit mechanism.

3. The foldable infant bed of claim 2 further comprising an upper unfolding limit mechanism and a lower unfolding limit mechanism, the upper unfolding limit mechanism comprising a plurality of one-way joints fixed on the upper part of the central seat, the lower unfolding limit mechanism comprising a plurality of one-way joints fixed to the lower part of the center seat, one end of the upper bottom rod pivotally connected to the upper one-way joint, and one end of the lower bottom rod pivotally connected to the lower one-way joint.

4. The foldable infant bed of claim 1 comprising four vertical supports, including two first vertical supports and two second vertical supports, upper parts of the two first vertical supports pivotally connected with the upper part of the corresponding second vertical support and forming a side bed frame having a first bed frame seat and a second bed frame seat, an upper part of a first vertical support, an upper part of a second vertical support, the first bed frame seat and the second bed frame seat are rotatably connected by concentric shafts.

5. The foldable infant bed according to claim 4, further comprising a first bed fence including two first bed fence rods, at least one of the two first bed fence rods having a first end rotatably connected to a first one-way rotating joint and a second end is rotatably connected to the first bed fence seat.

* * * * *